United States Patent
Zhu

(10) Patent No.: US 11,662,219 B2
(45) Date of Patent: May 30, 2023

(54) ROUTING BASED LANE GUIDANCE SYSTEM UNDER TRAFFIC CONE SITUATION

(71) Applicant: Baidu USA LLC, Sunnyvale, CA (US)

(72) Inventor: Fan Zhu, Sunnyvale, CA (US)

(73) Assignee: BAIDU USA LLC, Sunnyvale, CA (US)

(*) Notice: Subject to any disclaimer, the term of this patent is extended or adjusted under 35 U.S.C. 154(b) by 168 days.

(21) Appl. No.: 16/909,404

(22) Filed: Jun. 23, 2020

(65) Prior Publication Data

US 2021/0396540 A1    Dec. 23, 2021

(51) Int. Cl.
| | | |
|---|---|---|
| *B60W 30/12* | (2020.01) | |
| *G01C 21/36* | (2006.01) | |
| *G01C 21/34* | (2006.01) | |
| *G06V 20/58* | (2022.01) | |
| *G06V 20/56* | (2022.01) | |

(52) U.S. Cl.
CPC ..... *G01C 21/3658* (2013.01); *G01C 21/3415* (2013.01); *G06V 20/58* (2022.01); *G06V 20/582* (2022.01); *G06V 20/588* (2022.01)

(58) Field of Classification Search
CPC ............ G01C 21/3658; G01C 21/3415; G06V 20/58; G06V 20/582; G06V 20/588; G05D 1/0214; B60W 30/18163; B60W 30/0956; B60W 60/0011; B60W 2552/50; B60W 30/12; G08G 1/167; G08G 1/09623; B62D 15/0265
See application file for complete search history.

(56) References Cited

U.S. PATENT DOCUMENTS

| | | | |
|---|---|---|---|
| 9,120,486 B1* | 9/2015 | Mallinger | B60W 30/12 |
| 2016/0046290 A1* | 2/2016 | Aharony | B60W 30/0953 |
| | | | 701/41 |
| 2016/0311430 A1* | 10/2016 | Sakamoto | B60W 10/18 |
| 2018/0247138 A1* | 8/2018 | Kang | G08G 1/165 |
| 2020/0086790 A1* | 3/2020 | Gallagher | B60R 1/00 |
| 2020/0192386 A1* | 6/2020 | Stenneth | G05D 1/0214 |
| 2020/0255008 A1* | 8/2020 | Kim | B62D 1/28 |
| 2021/0282138 A1* | 9/2021 | Chen | H04W 72/042 |

* cited by examiner

Primary Examiner — Kenneth J Malkowski
(74) Attorney, Agent, or Firm — Womble Bond Dickinson (US) LLP

(57) ABSTRACT

In one embodiment, a perception module of an autonomous driving vehicle (ADV) detects a temporary traffic control device (TTCD) located within a first lane of a multi-lane roadway. The first lane is added to a black list of one or more lanes that the ADV is not permitted to drive within. A rerouting request is made to a planning module of the ADV to route the ADV to a second lane in the multi-lane roadway. The ADV navigates to the second lane and continues navigating along the requested rerouting. The ADV monitors for additional TTCDs. One or more boundary lines of the first lane can be marked "do not cross" so that the ADV does not navigate, even partially, back into the first lane. If there are no more TTCDs in the first lane for a predetermined distance ahead of the ADV, the first lane is deleted from the black list.

9 Claims, 8 Drawing Sheets

ROUTING BASED LANE GUIDANCE SYSTEM UNDER TRAFFIC CONE SITUATION

TECHNICAL FIELD

Embodiments of the present disclosure relate generally to operating autonomous driving vehicles. More particularly, embodiments of the disclosure relate to navigating an autonomous driving vehicle (ADV) in/around unusual traffic obstacles such as traffic cones.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Motion planning and control are critical operations in autonomous driving. However, conventional motion planning operations estimate the difficulty of completing a given path mainly from its curvature and speed, without considering the differences in features for different types of vehicles. Same motion planning and control is applied to all types of vehicles, which may not be accurate and smooth under some circumstances.

Traffic cones are a commonly-occurring obstacle within a roadway. However a traffic cone is different from other common obstacles such as bicycles, pedestrians and other vehicles. When an autonomous driving vehicle (ADV) encounters a bicycle, pedestrian, or other vehicle, the ADV may simply adjust its route around the obstacle. In contrast, a traffic cone has one or more special meanings, different from other common obstacles. A traffic cone may indicate that a lane in which the traffic cone appears is blocked and the ADV is not to use the blocked lane. A traffic cone can also indicate that a driver is to slowly avoid the lane having the traffic cone and that one or more persons, vehicles, or activities may be present beyond the traffic cone.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to some embodiments, a perception module of an autonomous driving vehicle (ADV) detects a temporary traffic control device (TTCD) located within a first lane of a multi-lane roadway. The first lane is added to a black list of one or more lanes that the ADV is not permitted to drive within. A rerouting request is made to a planning module of the ADV to route the ADV to a second lane in the multi-lane roadway. The ADV navigates to the second lane and continues navigating along the requested rerouting. The ADV monitors for additional TTCDs. One or more boundary lines of the first lane can be marked "do not cross" so that the ADV does not navigate, even partially, back into the first lane. If there are no more TTCDs in the first lane for a predetermined distance ahead of the ADV, the first lane is deleted from the black list. The one or more boundary lines of the first lane are marked "ok to cross" so that the ADV may request another routing and the rerouting can include navigating the ADV within the first lane. TTCDs can be one or more of: a traffic cone, an "arrow" sign indicating that vehicles are to navigating out of the first lane, a sign showing that the first lane must merge right or merge left, and the like.

Figure 1:
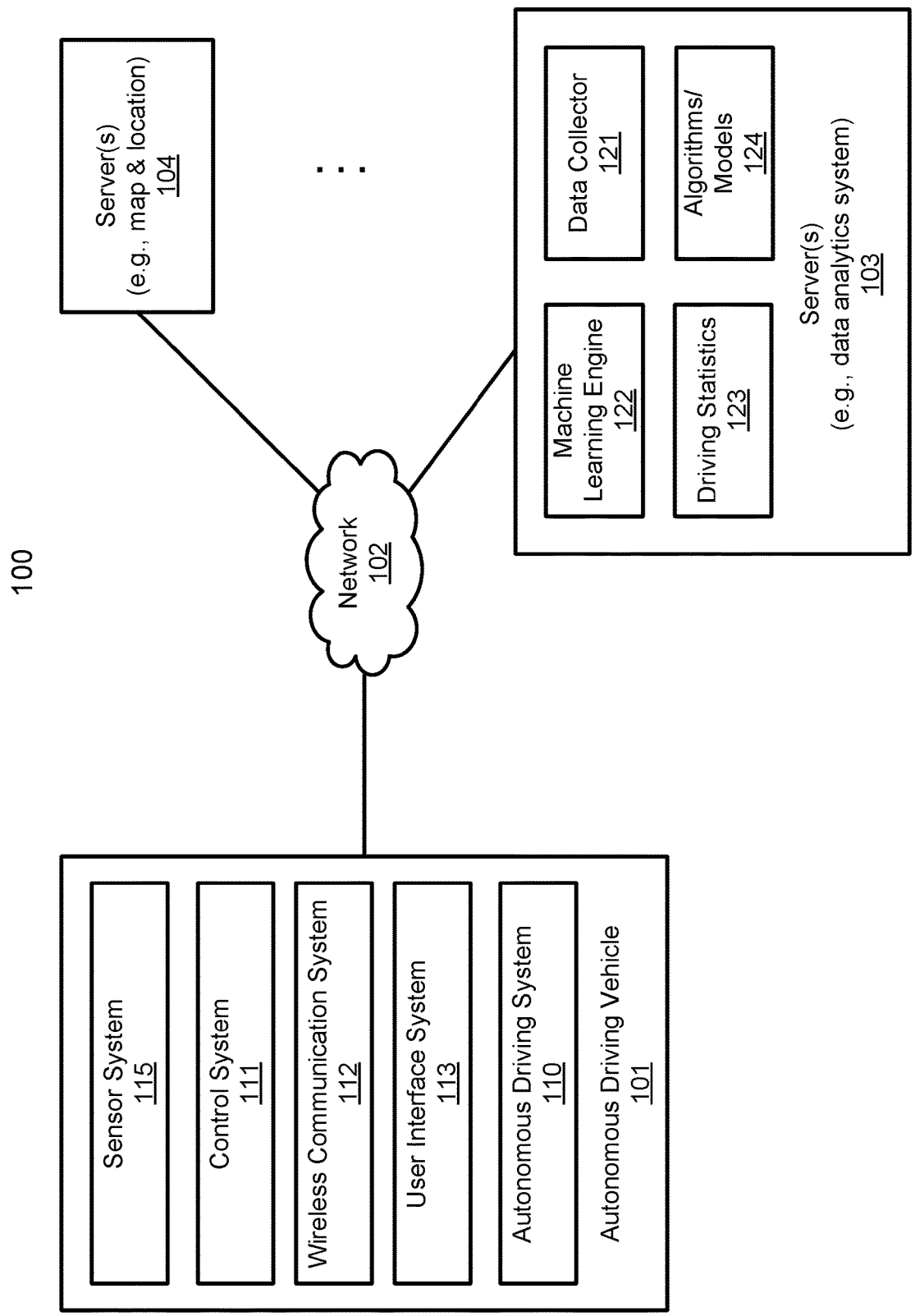
FIG. 1 is a block diagram illustrating a networked system according to one embodiment.

FIG. 1 is a block diagram illustrating an autonomous driving network configuration according to one embodiment of the disclosure. Referring to FIG. 1, network configuration 100 includes autonomous driving vehicle (ADV) 101 that may be communicatively coupled to one or more servers 103-104 over a network 102. Although there is one ADV shown, multiple ADVs can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, or location servers, etc.

An ADV refers to a vehicle that can be configured to in an autonomous mode in which the vehicle navigates through an environment with little or no input from a driver. Such an ADV can include a sensor system having one or more sensors that are configured to detect information about the environment in which the vehicle operates. The vehicle and its associated controller(s) use the detected information to navigate through the environment. ADV 101 can operate in a manual mode, a full autonomous mode, or a partial autonomous mode.

In one embodiment, ADV 101 includes, but is not limited to, autonomous driving system (ADS) 110, vehicle control system 111, wireless communication system 112, user interface system 113, and sensor system 115. ADV 101 may further include certain common components included in ordinary vehicles, such as, an engine, wheels, steering wheel, transmission, etc., which may be controlled by vehicle control system 111 and/or ADS 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
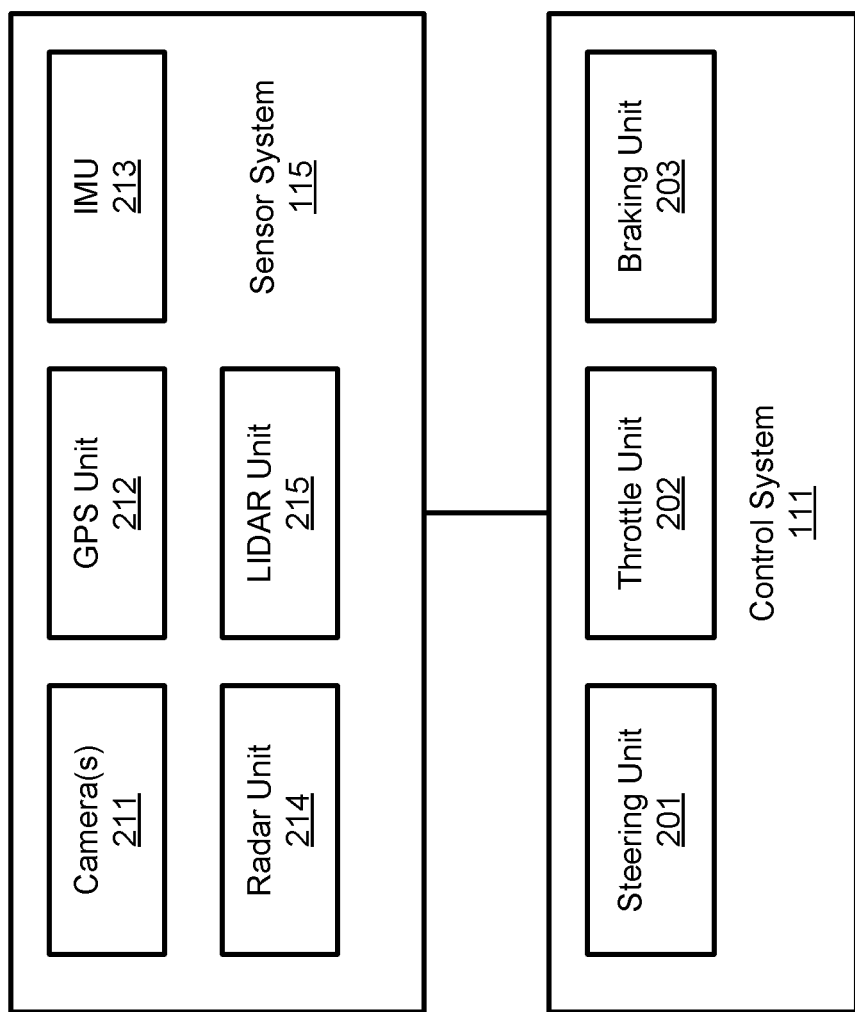
FIG. 2 is a block diagram illustrating an example of an autonomous driving vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the ADV. IMU unit 213 may sense position and orientation changes of the ADV based on inertial acceleration. Radar unit 214 may represent a system that utilizes radio signals to sense objects within the local environment of the ADV. In some embodiments, in addition to sensing objects, radar unit 214 may additionally sense the speed and/or heading of the objects. LIDAR unit 215 may sense objects in the environment in which the ADV is located using lasers. LIDAR unit 215 could include one or more laser sources, a laser scanner, and one or more detectors, among other system components. Cameras 211 may include one or more devices to capture images of the environment surrounding the ADV. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the ADV. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn controls the speed and acceleration of the vehicle. Braking unit 203 is to decelerate the vehicle by providing friction to slow the wheels or tires of the vehicle.

Note that the components as shown in FIG. 2 may be implemented in hardware, software, or a combination thereof.

Referring back to FIG. 1, wireless communication system 112 is to allow communication between ADV 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of ADV 101 may be controlled or managed by ADS 110, especially when operating in an autonomous driving mode. ADS 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, ADS 110 may be integrated with vehicle control system 111.

For example, a user as a passenger may specify a starting location and a destination of a trip, for example, via a user interface. ADS 110 obtains the trip related data. For example, ADS 110 may obtain location and route data from an MPOI server, which may be a part of servers 103-104. The location server provides location services and the MPOI server provides map services and the POIs of certain locations. Alternatively, such location and MPOI information may be cached locally in a persistent storage device of ADS 110.

While ADV 101 is moving along the route, ADS 110 may also obtain real-time traffic information from a traffic information system or server (TIS). Note that servers 103-104 may be operated by a third party entity. Alternatively, the functionalities of servers 103-104 may be integrated with ADS 110. Based on the real-time traffic information, MPOI information, and location information, as well as real-time local environment data detected or sensed by sensor system 115 (e.g., obstacles, objects, nearby vehicles), ADS 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either ADVs or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. In one embodiment, algorithms 124 may include training a temporary traffic control devices (TTCD) navigation module for ADVs to learn to detect placement of various TTCDs to indicate that one or more lanes of a multi-lane roadway are closed to traffic. TTCD placement is not standardize and machine learning 122 may be used to train algorithms/models 124 from data collected by data collector 121 about various placement techniques used for TTCDs to indicate lane closure. Driving statistics of reroutings that ADVs have used in response to detecting a placement pattern of TTCDs to indicate lane closure, for future planning and routing logic extensions. Algorithms 124 can then be uploaded on ADVs to be utilized during autonomous driving in real-time.

Figure 3A:
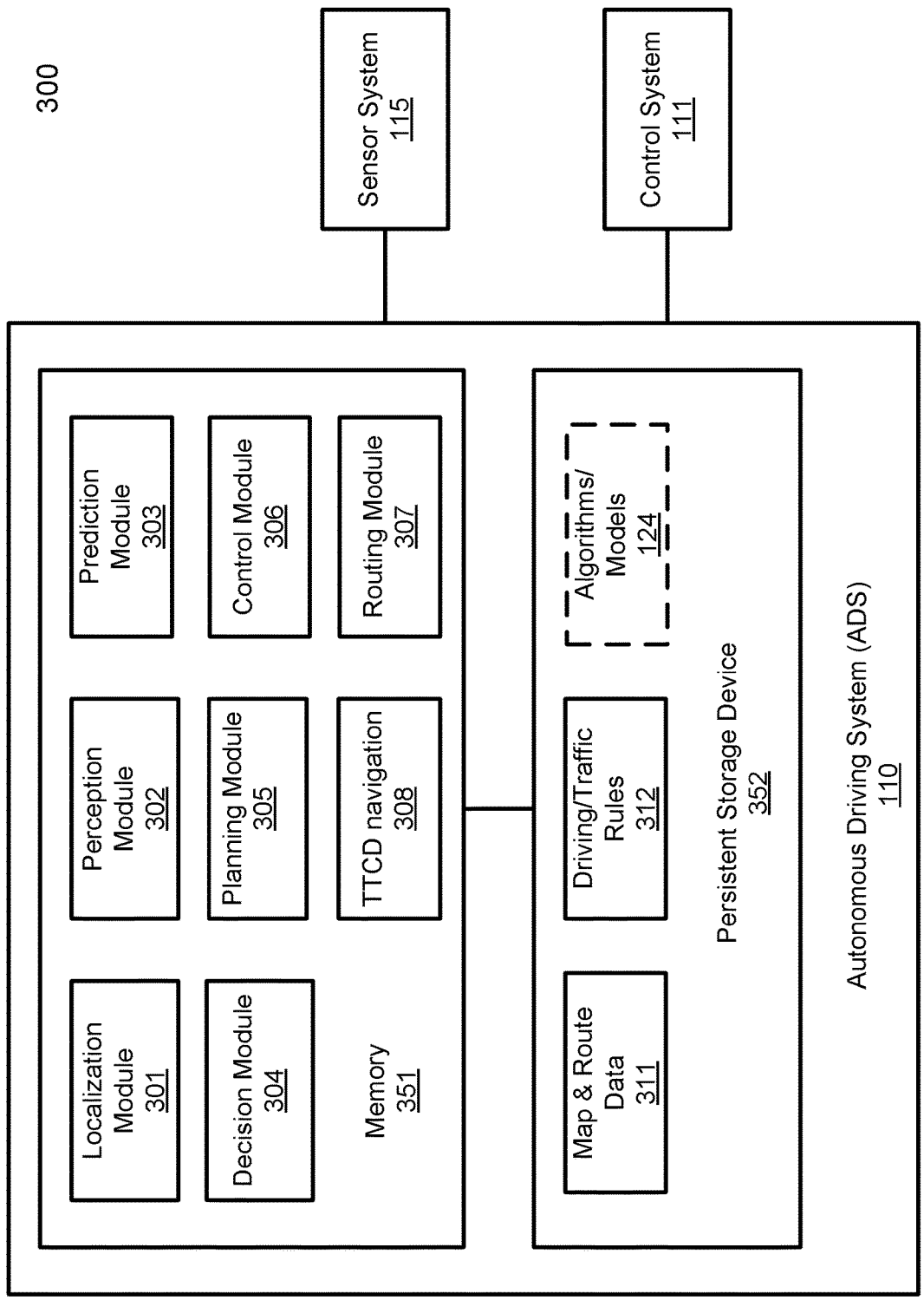
FIGS. 3A-3B are block diagrams illustrating an example of an autonomous driving system used with an autonomous driving vehicle according to one embodiment.
Figure 3B:
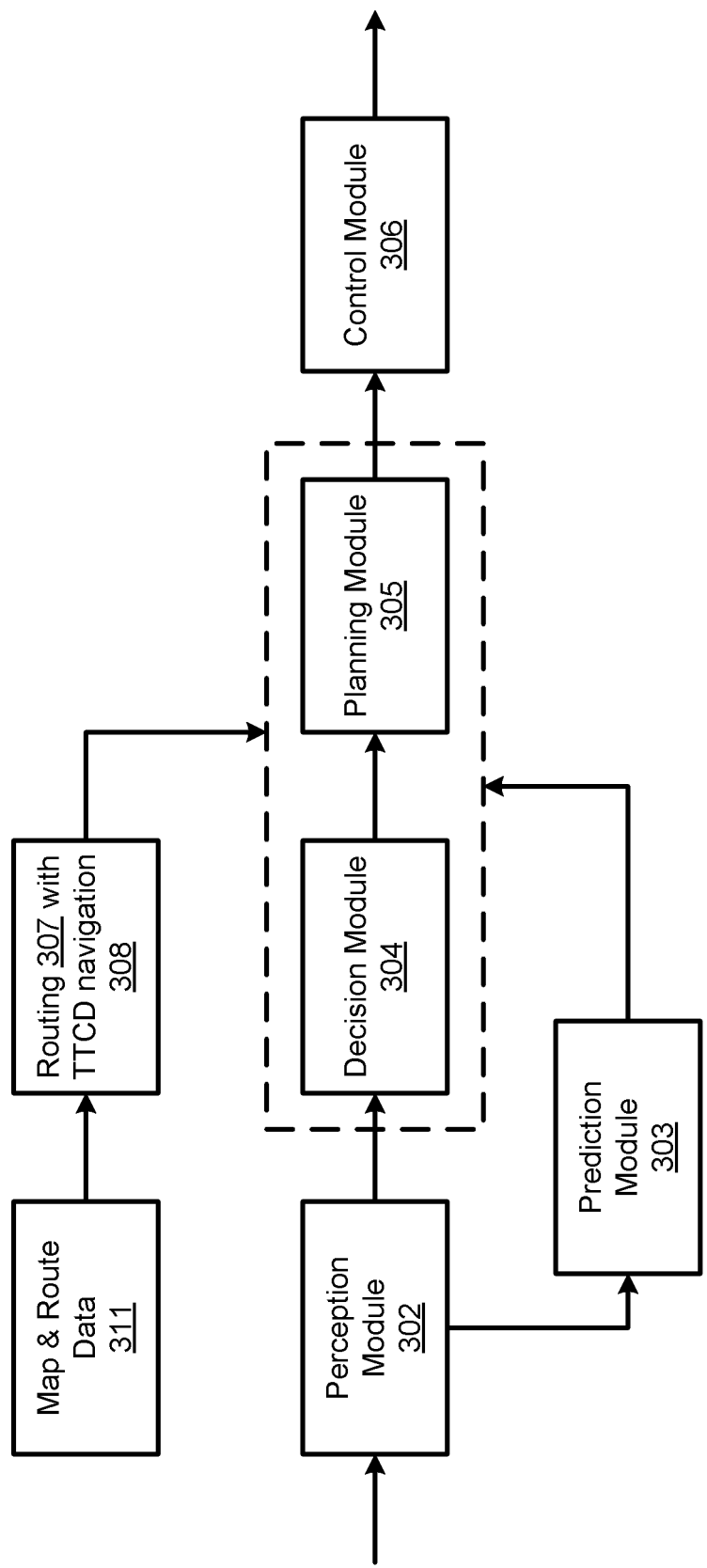

FIGS. 3A and 3B are block diagrams illustrating an example of an autonomous driving system 300 used with an ADV according to one embodiment. System 300 may be implemented as a part of ADV 101 of FIG. 1 including, but is not limited to, autonomous driving system (ADS) 110, control system 111, and sensor system 115. Referring to FIGS. 3A-3B, ADS 110 includes, but is not limited to, localization module 301, perception module 302, prediction module 303, decision module 304, planning module 305, control module 306, routing module 307, and temporary traffic control device (TTCD) navigation module 308.

Some or all of modules 301-308 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-308 may be integrated together as an integrated module. For example, module 308 may be implemented as a part of perception module 302 and/or planning module 305.

Localization module 301 determines a current location of ADV 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of ADV 300, such as map and route data 311, to obtain the trip related data. For example, localization module 301 may obtain location and route data from a location server and a map and POI (MPOI) server. A location server provides location services and an MPOI server provides map services and the POIs of certain locations, which may be cached as part of map and route data 311. While ADV 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 can detect one or more temporary traffic control devices (TTCDs) in a roadway having one or more lanes. TTCDs can include traffic cones, "arrow" signs, which may be, e.g. metal painted signs or lighted signs, temporary traffic barriers with or without signs, and the like. TTCDs within a lane of a roadway are detected by a perception module of the ADV and are used for navigating the autonomous vehicle out of a lane that is "closed." Perception module 302 notifies planning module 305 and TTCD navigation module 308 of the presence of one or more TTCDs in the roadway.

Perception module 302 may include a computer vision system or functionalities of a computer vision system to process and analyze images captured by one or more cameras in order to identify objects and/or features in the environment of the ADV. The objects can include traffic signals, road way boundaries, other vehicles, pedestrians, temporary traffic control devices (TTCDs) and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition.

That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the ADV, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 miles per hour (mph), then change to a right lane at the speed of 25 mph.

Based on the planning and control data, control module 306 controls and drives the ADV, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the ADV. For example, the navigation system may determine a series of speeds and directional headings to affect movement of the ADV along a path that substantially avoids perceived obstacles while generally advancing the ADV along a roadway-based path leading to an ultimate destination. The destination may be set according to user inputs via user interface system 113. The navigation system may update the driving path dynamically while the ADV is in operation. The navigation system can incorporate data from a GPS system and one or more maps so as to determine the driving path for the ADV.

Temporary traffic control device (TTCD) navigation module 308 receives an indication of a temporary traffic control device (TTCD), such as a traffic cone, from perception module 302. TTCD navigation module 308 can determine that the TTCD is in a first lane of a roadway in which the ADV is currently navigating. TTCD navigation module 308 causes the planning module 305 and routing module 307 of the ADV to mark the first lane, in which the TTCD is detected, as a black listed lane so that planning module 305 and routing module 307 do not consider using the first lane to navigate the ADV, when making subsequent routing decisions. TTCD navigation module 308 then requests a rerouting for the ADV from the routing module 307.

Routing module 307 finds a new route, into a second lane, and navigates the ADV into the second lane and along the new route. TTDC navigation module 308 can also cause planning module 305 and routing module 307 to mark one or more lane boundaries of the first lane as "do not cross," so that subsequent routing decisions by the routing and planning modules will not cross the one or more lane boundaries of the first lane. When perception module 302 determines that there are no more TTCDs in the first lane, for a predetermined distance, then TTCD navigation module 308 can cause planning module 305 and routing module 307 to reset the one or more boundary lines of the first lane, and remove the first lane from the black list lanes, so that future planning and routing decisions can cross the one or more boundaries of the first lane and can navigate the ADV into the first lane.

Figure 4:
FIG. 4 is a block diagram illustrating an example of a decision and planning system according to one embodiment.

FIG. 4 is a block diagram illustrating system architecture for autonomous driving according to one embodiment. System architecture 400 may represent system architecture of an autonomous driving system as shown in FIGS. 3A and 3B. Referring to FIG. 4, system architecture 400 includes, but it is not limited to, application layer 401, planning and control (PNC) layer 402, perception layer 403, driver layer 404, firmware layer 405, and hardware layer 406. Application layer 401 may include user interface or configuration application that interacts with users or passengers of an autonomous driving vehicle, such as, for example, functionalities associated with user interface system 113. PNC layer 402 may include functionalities of at least planning module 305 and control module 306. Perception layer 403 may include functionalities of at least perception module 302. In one embodiment, there is an additional layer including the functionalities of prediction module 303 and/or decision module 304. Alternatively, such functionalities may be included in PNC layer 402 and/or perception layer 403. System architecture 400 further includes driver layer 404, firmware layer 405, and hardware layer 406. Firmware layer 405 may represent at least the functionality of sensor system 115, which may be implemented in a form of a field programmable gate array (FPGA). Hardware layer 406 may represent the hardware of the autonomous driving vehicle such as control system 111. Layers 401-403 can communicate with firmware layer 405 and hardware layer 406 via device driver layer 404.

Figure 5B:
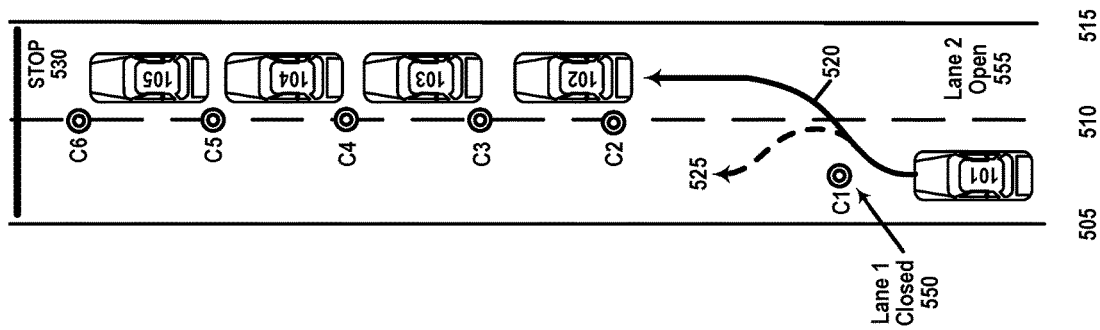
FIGS. 5A and 5B illustrate driving scenarios in which an autonomous driving vehicle navigates in the presence of one or more temporary traffic control devices (TTCDs), according to some embodiments.
Figure 5A:
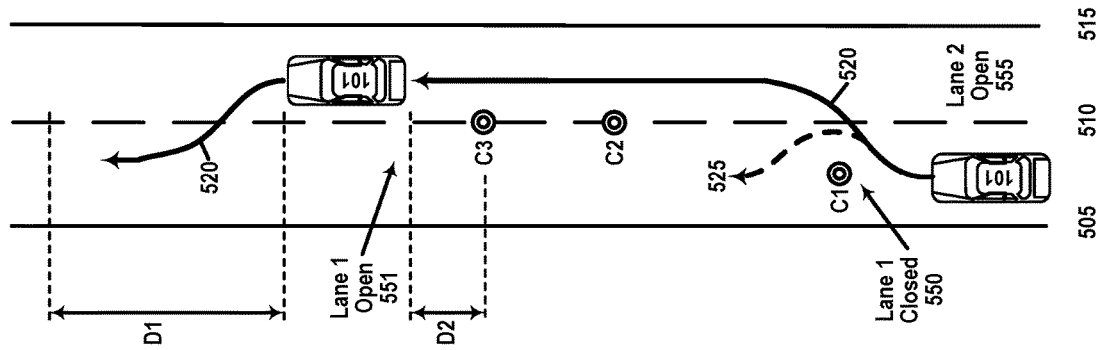

FIGS. 5A and 5B illustrate driving scenarios in which an autonomous driving vehicle navigates in the presence of one or more temporary traffic control devices (TTCDs), according to some embodiments. FIG. 5A illustrates a driving scenario wherein a plurality of TTCDs, in this case traffic cones C1, C2, and C3, indicate that lane 1 is closed (reference 550, "Lane 1 closed"). An example multi-lane roadway includes a first lane and a second lane. Reference 505 can be a physical edge of a roadway, such as a curb or shoulder of the multi-lane roadway, or can be a painted stripe, or other indication of a left boundary to lane 1. Reference 510 is a right boundary of lane 1 and can be indicated by, e.g., a dashed painted stripe. Reference 510 is also the left boundary of lane 2. Reference 515 can be a physical edge of a roadway, such as a curb or shoulder of the roadway, or can be a painted stripe, or other indication of the right boundary of lane 2. An ADV 101 is navigating a driving route within lane 1. ADV 101 perceives a TTCD in lane 1, using perception module 302. In this instance, the TTCD is traffic cone C1. Traffic cone C1 indicates that lane 1 is closed 550.

A human driver, or an ADV of the prior art, may choose path 525 (dashed line), because a planning module detects that the roadway is clear of obstacles on the other side of traffic cone C1. However, path 525 would be both unsafe and unlawful as traffic cone C1 is intended to keep traffic out of closed lane 1.

In Applicant's embodiments, temporary traffic control device (TTCD) navigation module 308 can cause planning module 305 and routing module 307 to mark lane 1 as black listed, such that planning module 305 and routing module 307 will not consider using lane 1 in future routing decisions. TTCD navigation module 308 then requests a rerouting for ADV 101 from the routing module 307 or planning module 305. Routing module 307 provides a new route for ADV 101 to navigate to open lane 2 (reference 555) along new path 520. Then, TTCD navigation module 308 can request that planning module 305 and routing module 307 also mark one or more of the lane boundaries of lane 1 so that the lane boundaries indicate "do not cross" the lane boundary into lane 1, for future routing decisions. In the example of FIG. 5A, after ADV 101 navigates along new route 520 in lane 2, TTCD navigation module 308 causes planning module 305 and routing module 307 to mark reference line 510 (which is the right lane boundary of lane 1 and left lane boundary of lane 2) as "do not cross," for future routing decisions, until lane 1 is determined to be open again.

As ADV 101 navigates along route 520, ADV 101 perception module 302 detects traffic cone C2, indicating that lane 1 is still closed. ADV 101 perception module 302 further detects traffic cone C3, indicating that lane 1 is still closed. As ADV 101 passes traffic cone C3, ADV 101 detects, for a distance D1, that there are no further traffic cones ahead of the ADV 101, and therefore, lane 1 is deemed to be open. TTCD navigation module 308 can cause planning module 305 to reset the indication of one or more lane boundaries of lane 1 to "ok to cross," and can further remove lane 1 from the black list of lanes. Accordingly, after ADV 101 has passed traffic cone C3 by a small distance D2, then TTCD navigation module 308 can request a rerouting for ADV 101 from planning module 305. Planning module 305 can reroute the path 520 of ADV back into lane 1, or remain in lane 2.

FIG. 5B illustrates a driving scenario wherein a plurality of temporary traffic control devices (TTCDs), in this case traffic cones C1 through C6, indicate that lane 1 is closed (reference 550). An example multi-lane roadway includes a first lane and a second lane. Reference 505 can be a physical edge of a roadway, such as a curb or shoulder of the roadway, or can be a painted stripe, or other indication of a left boundary to lane 1. Reference 510 is a right boundary of lane 1 and can be indicated by, e.g., a dashed painted stripe. Reference 510 is also the left boundary of lane 2. Reference 515 can be a physical edge of a roadway, such as a curb or shoulder of the roadway, or can be a painted stripe, or other indication of the right boundary of lane 2. An ADV 101 is navigating a driving route within lane 1. ADV 101 perceives a TTCD, using perception module 302. In this instance, the TTCD is traffic cone C1. Traffic cone C1 indicates that lane 1 is closed.

A human driver, or an ADV of the prior art, may choose path 525 (dashed line), because a planning module detects that there are not obstacles in the first lane after TTCD cone C1, and cars are stopped in lane 2. Driving in a lane that is stopped is generally undesirable because there will likely be a delay if lane 2 is chosen. However, path 525 would be both unsafe and unlawful, because C1 is intended to keep traffic out of closed lane 1.

In Applicant's embodiments, temporary traffic control device (TTCD) navigation module 308 can cause planning module 305 and routing module 307 to mark lane 1 as black listed, such that planning module 305 and routing module 307 will not consider using lane 1 in future routing decisions. TTCD navigation module 308 then requests a rerouting for ADV 101 from the routing module 307. Routing module 307 provides a new route for ADV 101 using open lane 2 (reference 555) along new path 520. Then, TTCD navigation module 308 can request that planning module 305 and routing module 307 also mark one or more of the lane boundaries of lane 1 so that the lane boundaries indicate "do not cross" the lane boundary into lane 1, for future routing decisions. In the example of FIG. 5B, after ADV 101 navigates along new route 520 in lane 2, TTCD navigation module 308 marks reference line 510 (which is the right lane boundary of lane 1 and left lane boundary of lane 2) as "do not cross" for future routing decisions, until lane 1 is determined to be open again.

As ADV 101 navigates along route 520, ADV 101 perception module 302 detects that traffic is stopped in lane 2, due to stop signal 530, and ADV 101 comes to a safe stop behind ADVs 102 through 105, which are stopped at stop signal 530. ADV 101 does not attempt to navigate into lane 1, even though there are no obstacles within lane 2, because planning module 305 has black listed lane 1 and the right boundary of lane 1 (reference 510) has been marked as "do not cross."

Figure 6A:
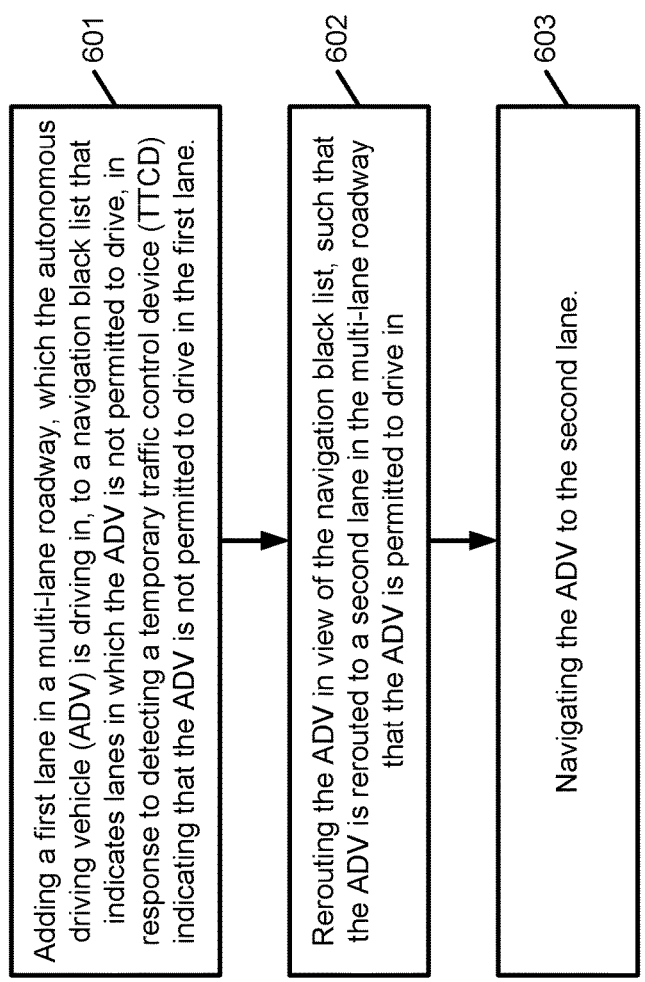
FIGS. 6A and 6B are methods of navigating an autonomous driving vehicle on a multi-lane roadway having one or more temporary traffic control devices (TTCDs), according to some embodiments.
Figure 6B:
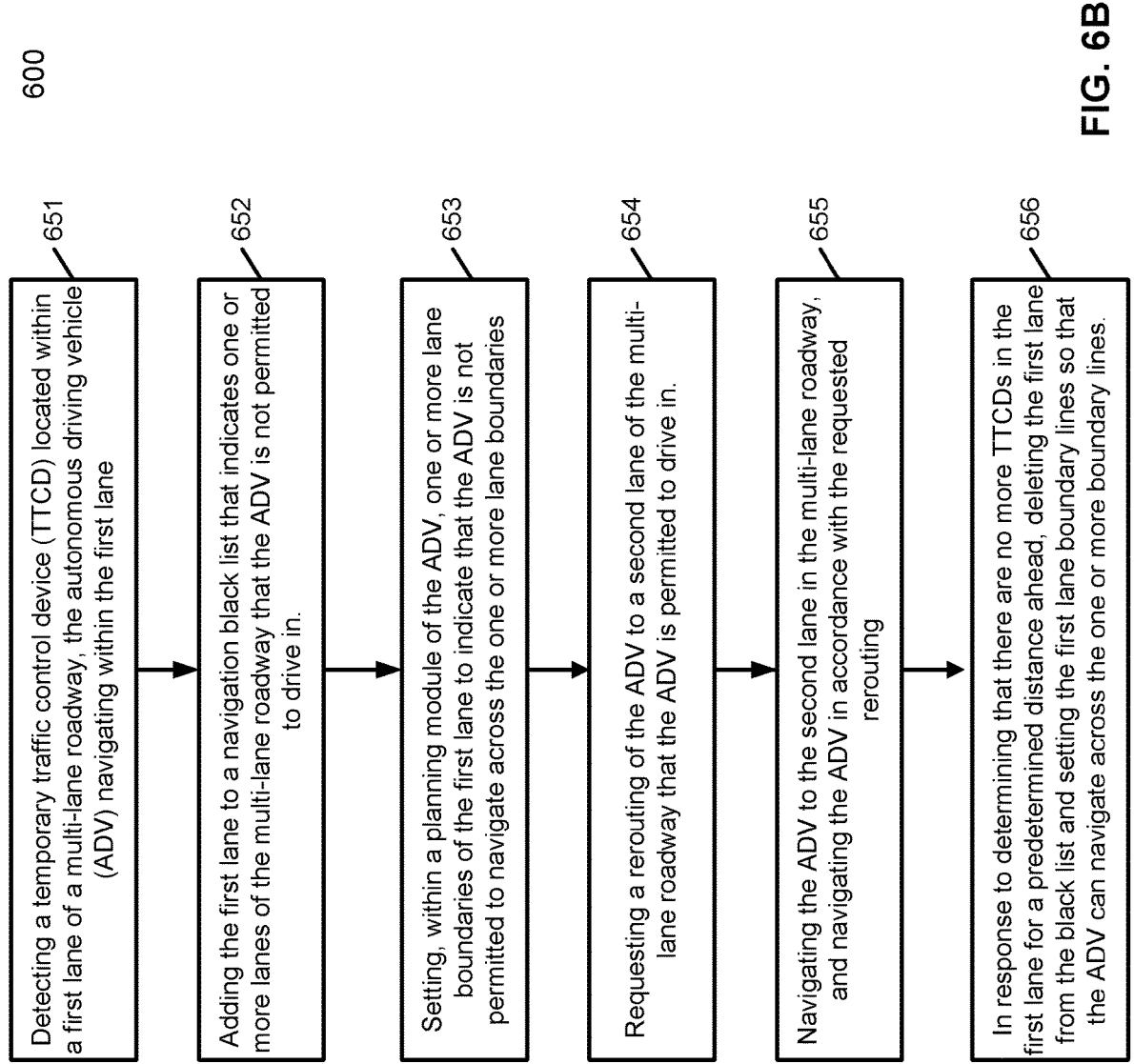

FIGS. 6A and 6B are methods 600 of navigating an autonomous driving vehicle (ADV) on a multi-lane roadway having one or more temporary traffic control devices (TTCDs), according to some embodiments. With reference to FIG. 6A, in operation 601, a first lane in the multi-lane roadway, which the ADV is driving in, to a navigation black list that indicates lanes in which the ADV is not permitted to drive, in response to detecting a TTCD indicating that the ADV is not permitted to drive in the first lane. The navigation black list can be maintained by the routing module 307 and/or the planning module 305 of the ADV.

In operation 602, the ADV is rerouted in view of the navigation black list, such that the ADV is rerouted to a second lane in the multi-lane roadway that the ADV is permitted to drive in.

In operation 603, the ADV navigates to the second lane.

FIG. 6B illustrates another method 600 for navigating an autonomous driving vehicle on a multi-lane roadway having one or more temporary traffic control devices (TTCDs), according to some embodiments. With reference to FIG. 6B, in operation 651, a perception module 302 of an autonomous driving vehicle (ADV) detects a temporary traffic control device (TTCD) located within a first lane of a multi-lane roadway. The ADV is currently navigating in the first lane of the multi-lane roadway.

In operation 652, TTCD navigation module 308 can cause a planning module 305 and a routing module 307 of the ADV to mark the first lane as "black listed" so that planning and routing modules of the ADV will not consider using the first lane in future planning and routing decisions. The ADV is not permitted to navigate into the first, black listed, lane.

In operation 653, TTCD navigation module 308 can cause planning module 305 and routing module 307 to set one or more lane boundaries of the first lane to "do not cross" status to indicate that the ADV is not to navigate across the one or more boundaries of the first lane. In operation 654, the TTCD navigation module 308 causes a request for a rerouting of the ADV to be issued to the routing module 307, out of the closed first lane.

In operation 655, routing module 307 executes a new route 520, navigating the ADV into a second lane of the multi-lane roadway. The ADV navigates into lane 2, and navigates the ADV 101 along the new route 520.

In operation 656, in response to determining that there are no more TTCDs in the first lane, for a predetermined distance ahead of the ADV, the TTCD navigation module 308 causes the planning and routing modules to delete the first lane from the black list of lanes that are available for use in planning and routing the ADV, and setting one or more of the first lane boundaries to "ok to cross" status so that future planning and routing decisions will permit the ADV to cross the one or more boundaries of the first lane. Method 600 ends.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A method of navigating an autonomous driving vehicle (ADV) on a multi-lane roadway, comprising:
    detecting a temporary traffic control device (TTCD) located within a first lane of the multi-lane roadway, wherein the ADV is navigating within the first lane;
    detecting a physical lane boundary line of the first lane;
    adding the first lane to a navigation black list that indicates one or more lanes of the multi-lane roadway that the ADV is not permitted to drive in;
    requesting a rerouting of the ADV in view of the navigation black list, such that the ADV is rerouted to a second lane in the multi-lane roadway that the ADV is permitted to drive in;
    navigating to the second lane in the multi-lane roadway, and navigating the ADV in accordance with the requested rerouting;
    in addition to adding the first lane to the navigation black list, setting a reference line representing the physical lane boundary line of the first lane within a routing module of the ADV such that routing decisions of the ADV do not navigate, even partially, back into the first lane;

monitoring for additional TTCDs ahead of the ADV;

in response to determining that there are no TTCDs in the first lane for a predetermined first distance ahead of current position of the ADV, deleting the first lane from the navigation black list and setting the reference line representing the physical lane boundary line of the first lane such that the routing decisions of the ADV may navigate across the physical lane boundary line, wherein the predetermined first distance is based upon a forward perception distance limit of a perception module of the ADV having one or more sensors; and in response to determining that the ADV has passed a last one of the additional TTCDs by a predetermined second distance, different from the predetermined first distance, requesting a rerouting of the ADV and navigating the ADV in accordance with the requested rerouting.

2. The method of claim 1, wherein the TTCD comprises at least one of a traffic cone or a transitional arrow indication that the first lane is closed to vehicles, ahead.

3. The method of claim 1, wherein the TTCD comprises a sign indicating that the first lane is closed ahead.

4. A non-transitory machine-readable medium having instructions stored therein, which when executed by a processor, cause the processor to perform operations for navigating an autonomous driving vehicle (ADV) on a multi-lane roadway, the operations comprising:

detecting a temporary traffic control device (TTCD) located within a first lane of the multi-lane roadway, wherein the ADV is navigating within the first lane;

detecting a physical lane boundary line of the first lane;

adding the first lane to a navigation black list that indicates one or more lanes of the multi-lane roadway that the ADV is not permitted to drive in;

requesting a rerouting of the ADV in view of the navigation black list, such that the ADV is rerouted to a second lane in the multi-lane roadway that the ADV is permitted to drive in;

navigating to the second lane in the multi-lane roadway, and navigating the ADV in accordance with the requested rerouting;

in addition to adding the first lane to the navigation black list, setting a reference line representing the physical lane boundary line of the first lane within a routing module of the ADV such that routing decisions of the ADV do not navigate, even partially, back into the first lane;

monitoring for additional TTCDs ahead of the ADV;

in response to determining that there are no TTCDs in the first lane for a predetermined first distance ahead of current position of the ADV, deleting the first lane from the navigation black list and setting the reference line representing the physical lane boundary line of the first lane such that the routing decisions of the ADV may navigate across the physical lane boundary line, wherein the predetermined first distance is based upon a forward perception distance limit of a perception module of the ADV having one or more sensors; and in response to determining that the ADV has passed a last one of the additional TTCDs by a predetermined second distance, different from the predetermined first distance, requesting a rerouting of the ADV and navigating the ADV in accordance with the requested rerouting.

5. The medium of claim 4, wherein the TTCD comprises at least one of a traffic cone or a transitional arrow indication that the first lane is closed to vehicles ahead.

6. The medium of claim 4, wherein the TTCD comprises a sign indicating that the first lane is closed, ahead.

7. A data processing system, comprising:

a processor; and a memory coupled to the processor to store instructions, which when executed by the processor, cause the processor to perform operations for navigating an autonomous driving vehicle (ADV) on a multi-lane roadway, the operations including:

detecting a temporary traffic control device (TTCD) located within a first lane of the multi-lane roadway, wherein the ADV is navigating within the first lane;

detecting a physical lane boundary line of the first lane;

adding the first lane to a navigation black list that indicates one or more lanes of the multi-lane roadway that the ADV is not permitted to drive in, requesting a rerouting of the ADV in view of the navigation black list, such that the ADV is rerouted to a second lane in the multi-lane roadway that the ADV is permitted to drive in, navigating to the second lane in the multi-lane roadway, and navigating the ADV in accordance with the requested rerouting;

in addition to adding the first lane to the navigation black list, setting a reference line representing the physical lane boundary line of the first lane within a routing module of the ADV such that routing decisions of the ADV do not navigate, even partially, back into the first lane;

monitoring for additional TTCDs ahead of the ADV;

in response to determining that there are no TTCDs in the first lane for a predetermined first distance ahead of current position of the ADV, deleting the first lane from the navigation black list and setting the reference line representing the physical lane boundary line of the first lane such that the routing decisions of the ADV may navigate across the physical lane boundary line, wherein the predetermined first distance is based upon a forward perception distance limit of a perception module of the ADV having one or more sensors; and in response to determining that the ADV has passed a last one of the additional TTCDs by a predetermined second distance, different from the predetermined first distance, requesting a rerouting of the ADV and navigating the ADV in accordance with the requested rerouting.

8. The system of claim 7, wherein the TTCD comprises at least one of a traffic cone or a transitional arrow indication that the first lane is closed to vehicles, ahead.

9. The system of claim 7, wherein the TTCD comprises a sign indicating that the first lane is closed, ahead.

* * * * *